United States Patent
Zhang et al.

(10) Patent No.: US 11,429,094 B2
(45) Date of Patent: Aug. 30, 2022

(54) DRONE COMMUNICATION SYSTEM AND COMMUNICATION SYSTEM OF DRONE SERVER

(71) Applicants: BEIJING JINGDONG SHANGKE INFORMATION TECHNOLOGY CO, LTD., Beijing (CN); BEIJING JINGDONG CENTURY TRADING CO., LTD., Beijing (CN)

(72) Inventors: Wenkai Zhang, Beijing (CN); Yali Wang, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 458 days.

(21) Appl. No.: 16/500,030

(22) PCT Filed: Apr. 20, 2018

(86) PCT No.: PCT/CN2018/083964
§ 371 (c)(1),
(2) Date: Oct. 1, 2019

(87) PCT Pub. No.: WO2018/210101
PCT Pub. Date: Nov. 22, 2018

(65) Prior Publication Data
US 2020/0174466 A1 Jun. 4, 2020

(30) Foreign Application Priority Data

May 16, 2017 (CN) .......................... 201710342625.X

(51) Int. Cl.
*B64C 39/02* (2006.01)
*G05D 1/00* (2006.01)
*H04L 43/10* (2022.01)

(52) U.S. Cl.
CPC ......... *G05D 1/0022* (2013.01); *B64C 39/024* (2013.01); *G05D 1/0088* (2013.01);
(Continued)

(58) Field of Classification Search
CPC . H04B 7/18506; H04L 43/0876; H04L 43/10; H04L 43/0811; G05D 1/0088;
(Continued)

(56) References Cited

U.S. PATENT DOCUMENTS 9,405,005 B1 * 8/2016 Arteaga ................ G01S 13/933
9,505,494 B1 11/2016 Marlow et al.
(Continued)

FOREIGN PATENT DOCUMENTS

| CN | 204316545 U | 5/2015 |
| CN | 204904034 U | 12/2015 |

(Continued)

OTHER PUBLICATIONS

Russian Federation Office Action dated Feb. 5, 2021 in Russian Federation Patent Application No. 2019137096/07 (073292) (with English Translation), 18 pages.

(Continued)

*Primary Examiner* — Jonathan A Bui
*Assistant Examiner* — Kidest Mendaye
(74) *Attorney, Agent, or Firm* — Oblon, McClelland, Maier & Neustadt, L.L.P.

(57) ABSTRACT

A drone communication system and method. The system includes a first communication module; a second communication module; and a drone processor electrically connected to the first communication module and the second communication module respectively; and configured to receive and send a heartbeat packet and communication data through a first communication module and a first communication network, so as to communicate with a first com- (Continued)

munication port of a server; receive and send communication data through a second communication module and a second communication network, so as to communicate with a second communication port of a server. A receiving condition of the heartbeat packet is used to determine whether to use the communication data received by the first communication network or the second communication network.

10 Claims, 5 Drawing Sheets

(52) U.S. Cl.
 CPC ........ *H04L 43/10* (2013.01); *B64C 2201/122* (2013.01); *B64C 2201/14* (2013.01)
(58) Field of Classification Search
 CPC .......................... G05D 1/0022; B64C 39/024; B64C 2201/14; B64C 2201/122; H04W 24/02
 See application file for complete search history.

(56) References Cited

U.S. PATENT DOCUMENTS

| | | | | |
|---|---|---|---|---|
| 9,613,536 | B1* | 4/2017 | Wolford | G08G 5/0026 |
| 2011/0035149 | A1* | 2/2011 | McAndrew | G05D 1/0038 |
| | | | | 701/466 |
| 2011/0245996 | A1* | 10/2011 | Orsulak | G05D 1/101 |
| | | | | 701/2 |
| 2012/0246339 | A1* | 9/2012 | Huang | H04L 49/557 |
| | | | | 709/239 |
| 2016/0163204 | A1* | 6/2016 | Raptopoulos | H04B 7/18506 |
| | | | | 701/3 |
| 2016/0363929 | A1* | 12/2016 | Clark | B64C 39/024 |
| 2017/0012697 | A1* | 1/2017 | Gong | H04W 16/18 |

FOREIGN PATENT DOCUMENTS

| | | |
|---|---|---|
| CN | 105487534 A | 4/2016 |
| CN | 105487543 A | 4/2016 |
| CN | 106406189 A | 2/2017 |
| CN | 106656683 A | 5/2017 |
| CN | 106998270 A | 8/2017 |
| RU | 2 390 815 C1 | 5/2010 |

OTHER PUBLICATIONS

International Search Report dated Jul. 19, 2018 in PCT/CN2018/083964 filed on Apr. 20, 2018.
CN Office Action dated May 21, 2019 for Application No. 201710342625.X, filed on May 16, 2017.

* cited by examiner

DRONE COMMUNICATION SYSTEM AND COMMUNICATION SYSTEM OF DRONE SERVER

CROSS-REFERENCE TO RELATED APPLICATIONS

This application is based on and claims the benefit of priority to the Chinese patent application No. 201710342625.X filed on May 16, 2017, which is hereby incorporated by reference in its entirety into the present application.

TECHNICAL FIELD

The present disclosure relates to the field of drone technology, and in particular, to a drone communication system, a drone communication system server, a communication system, a drone communication method, and a communication method of a drone server.

BACKGROUND

The logistics drone is an unmanned aerial vehicle having a navigation characteristic of a fixed route and a height range of about 80-120 meters during cruise. During the voyage, the logistics drone needs to use an onboard wireless communication device to maintain instant contact with a ground station which performs control to complete air navigation. The ground station is a fixed base station located on the ground. The current data communication link modes comprise digital radio, Wi-Fi network, and Bluetooth.

SUMMARY

According to one aspect of embodiments of the present disclosure, a drone communication system is provided. The drone communication system comprises: a first communication module; a second communication module; and a drone processor electrically connected to the first communication module and the second communication module respectively; and configured to: receive and send a heartbeat packet and communication data through the first communication module and a first communication network, so as to communicate with a first communication port of a server; receive and send communication data through the second communication module and a second communication network, so as to communicate with a second communication port of a server; wherein a receiving condition of the heartbeat packet is used to determine whether to use the communication data received by the first communication network or the second communication network is used.

In some embodiments, the drone processor is electrically connected to a flight control system; the drone processor is configured to: receive a drone heartbeat packet and drone flight state data from the flight control system; and send the drone heartbeat packet and the drone flight state data to the first communication module, and send the drone flight state data to the second communication module; the first communication module is configured to: receive the drone heartbeat packet and drone flight state data from the drone processor, and send the drone heartbeat packet and the drone flight state data to the first communication port of the server through the first communication network; the second communication module is configured to: receive the drone flight state data from the drone processor, and send the drone flight state data to the second communication port of the server through the second communication network; a receiving condition of the drone heartbeat packet is used by the server to determine whether drone scheduling is performed using the drone flight state data received by the first communication port or the second communication port.

In some embodiments, the first communication module is configured to: receive a server heartbeat packet and drone instruction data from the first communication port of the server through the first communication network, and send the server heartbeat packet and the drone instruction data to the drone processor; the second communication module is configured to: receive the drone instruction data from the second communication port of the server through the second communication network, and send the drone instruction data to the drone processor; the drone processor is configured to: determine whether data processing is performed using the drone instruction data received by the first communication module or the second communication module according to a receiving condition of the server heartbeat packet.

In some embodiments, the first communication network and the second communication network respectively have a line congestion flag bit and a line interruption flag bit, wherein the line congestion flag bit is used to identify an operation state of a communication network, and the line interruption flag bit is used to identify an interruption state of a communication network; the drone processor is configured to: modify the line congestion flag bit of the first communication network to be not in use, the line interruption flag bit of the first communication network to be interrupted, the line congestion flag bit of the second communication network to be in use, and perform data processing using the drone instruction data received by the second communication module, if the line congestion flag bit of the second communication network identifies that the second communication network is not in use, and if the line interruption flag bit of the second communication network identifies that the second communication network is not interrupted, in the case where the server heartbeat packet has not been received for a first predetermined number of times consecutively; modify the line interruption flag bit of the first communication network to be in use, the line congestion flag bit of the second communication network to be not in use, and perform data processing using the drone instruction data received by the first communication module, if the line congestion flag bit of the first communication network identifies that the first communication network is not in use in the case where receiving the server heartbeat packet has been recovered for a second predetermined number of times consecutively.

According to another aspect of embodiments of the present disclosure, a communication system of a drone server is provided. The communication system comprises: a first communication port; a second communication port; and a server processor electrically connected to the first communication port and the second communication port respectively; and configured to: receive and send a heartbeat packet and communication data through the first communication port and a first communication network, so as to communicate with a first communication module of a drone communication system; receive and send communication data through the second communication port and a second communication network, so as to communicate with a second communication module of the drone communication system; a receiving condition of the heartbeat packet is used to determine whether to use the communication data received by the first communication network or the second communication network.

In some embodiments, the server processor is electrically connected to a drone scheduling platform; the first communication port is configured to: receive a drone heartbeat packet and drone flight state data from the first communication module of the drone through the first communication network; and send the drone heartbeat packet and the drone flight state data to the server processor; the second communication port is configured to: receive drone flight state data from the second communication module of the drone through the second communication network; and send the drone flight state data to the server processor; the server processor is configured to determine whether drone scheduling is performed using the drone flight state data received by the first communication port or the second communication port according to a receiving condition of the drone heartbeat packet.

In some embodiments, the server processor is configured to: receive a server heartbeat packet and drone instruction data from the drone scheduling platform; and send the server heartbeat packet and the drone instruction data to the first communication port, and send the drone instruction data to the second communication port; the first communication port is configured to: receive the server heartbeat packet and drone instruction data from the server processor, and send the server heartbeat packet and the drone instruction data to the first communication module of the drone through the first communication network; the second communication port is further configured to: receive the drone instruction data from the server processor, and send the drone instruction data to the second communication module of the drone through the second communication network; a receiving condition of the server heartbeat packet is used by the communication system of the drone to determine whether data processing is performed using the drone instruction data received by the first communication module or the second communication module.

In some embodiments, the first communication network and the second communication network respectively have a line congestion flag bit and a line interruption flag bit, wherein the line congestion flag bit is used to identify an operation state of a communication network, and the line interruption flag bit is used to identify an interruption state of a communication network; the server processor is configured to: modify the line congestion flag bit of the first communication network to be not in use, the line interruption flag bit of the first communication network to be interrupted, the line congestion flag bit of the second communication network to be in use, and perform drone scheduling using the drone flight state data received by the first communication module, if the line congestion flag bit of the second communication network identifies that the second communication network is not in use, and if the line interruption flag bit of the second communication network identifies that the second communication network is not interrupted, in the case where the drone heartbeat packet has not been received for a first predetermined number of times consecutively; modify the line interruption flag bit of the first communication network to be in use, the line congestion flag bit of the second communication network to be not in use, and perform drone scheduling using the drone flight state data received by the second communication module, if the line congestion flag bit of the first communication network identifies that the first communication network is not in use in the case where receiving the drone heartbeat packet has been recovered for a second predetermined number of times consecutively.

According to a further aspect of embodiments of the present disclosure, a communication system is provided. The communication system comprises the foregoing drone communication system and a communication system of a drone server, comprising: a first communication port; a second communication port; and a server processor electrically connected to the first communication port and the second communication port respectively; and configured to: receive and send a heartbeat packet and communication data through the first communication port and a first communication network, so as to communicate with a first communication module of a drone communication system; receive and send communication data through the second communication port and a second communication network, so as to communicate with a second communication module of the drone communication system; a receiving condition of the heartbeat packet is used to determine whether to use the communication data received by the first communication network or the second communication network.

According to another aspect of embodiments of the present disclosure, a communication method of a drone is provided. The communication method comprises the steps that: a drone processor receives and sends a heartbeat packet and communication data through a first communication module and a first communication network to communicate with a first communication port of a server; a drone processor receives and sends communication data through a second communication module and a second communication network, so as to communicate with a second communication port of a server; a receiving condition of the heartbeat packet is used to determine whether to use the communication data received by the first communication network or the second communication network.

In some embodiments, a drone processor receives a drone heartbeat packet and drone flight state data from a flight control system; a drone processor sends the drone heartbeat packet and the drone flight state data to the first communication module, and sends the drone flight state data to the second communication module; the first communication module receives the drone heartbeat packet and the drone flight state data from the processor, and sends the drone heartbeat packet and the drone flight state data to the first communication port of the server through the first communication network; the second communication module receives the drone flight state data from the processor, and sends the drone flight state data to the second communication port of the server through the second communication network; a receiving condition of the drone heartbeat packet is used by the server to determine whether drone scheduling is performed using the drone flight state data received by the first communication port or the second communication port.

In some embodiments, the first communication module receives a server heartbeat packet and drone instruction data from the first communication port of the server through the first communication network, and sends the server heartbeat packet and the drone instruction data to the processor; the second communication module receives the drone instruction data from the second communication port of the server through the second communication network, and sends the drone instruction data to the processor; the drone processor determines whether data processing is performed using the drone instruction data received by the first communication module or the second communication module according to a receiving condition of the server heartbeat packet.

In some embodiments, the first communication network and the second communication network respectively have a line congestion flag bit and a line interruption flag bit, wherein the line congestion flag bit is used to identify an operation state of a communication network, and the line interruption flag bit is used to identify an interruption state of a communication network; the drone processor modifies the line congestion flag bit of the first communication network to be not in use, the line interruption flag bit of the first communication network to be interrupted, the line congestion flag bit of the second communication network to be in use, and performs data processing using the drone instruction data received by the second communication module, if the line congestion flag bit of the second communication network identifies that the second communication network is not in use, and if the line interruption flag bit of the second communication network identifies that the second communication network is not interrupted, in the case where the server heartbeat packet has not been received for a first predetermined number of times consecutively; the drone processor modifies the line interruption flag bit of the first communication network to be in use, the line congestion flag bit of the second communication network to be not in use, and performs data processing using the drone instruction data received by the first communication module, if the line congestion flag bit of the first communication network identifies that the first communication network is not in use in the case where the server heartbeat packet has been recovered for a second predetermined number of times consecutively.

In some embodiments, the communication method further comprises the steps that: a server processor receives and sends the heartbeat packet and communication data through the first communication port and the first communication network, so as to communicate with the first communication module of a drone communication system; a server processor receives and sends communication data through the second communication port and the second communication network to communicate with the second communication module of the drone communication system.

In some embodiments, the first communication port receives a drone heartbeat packet and drone flight state data from the first communication module of the drone through the first communication network, and sends the drone heartbeat packet and the drone flight state data to the server processor; the second communication port receives drone flight state data from the second communication module of the drone through the second communication network, and sends the drone flight state data to the server processor; the server processor determines whether drone scheduling is performed using the drone flight state data received by the first communication port or the second communication port according to a receiving condition of the drone heartbeat packet.

In some embodiments, the server processor receives a server heartbeat packet and drone instruction data from the drone scheduling platform and sends the server heartbeat packet and the drone instruction data to the first communication port, and sends the drone instruction data to the second communication port; the first communication module receives the server heartbeat packet and drone instruction data from the server processor, and sends the server heartbeat packet and the drone instruction data to the first communication module of the drone through the first communication network; the second communication module receives the drone instruction data from the server processor, and sends the drone instruction data to the second communication module of the drone through the second communication network; a receiving condition of the server heartbeat packet is used by the drone to determine whether data processing is performed using the drone instruction data received by the first communication module or the second communication module.

In some embodiments, the first communication network and the second communication network respectively have a line congestion flag bit and a line interruption flag bit, wherein the line congestion flag bit is used to identify an operation state of a communication network, and the line interruption flag bit is used to identify an interruption state of a communication network; the server processor modifies the line congestion flag bit of the first communication network to be not in use, the line interruption flag bit of the first communication network to be interrupted, the line congestion flag bit of the second communication network to be in use, and performs drone scheduling using the drone flight state data received by the first communication module, if the line congestion flag bit of the second communication network identifies that the second communication network is not in use, and if the line interruption flag bit of the second communication network identifies that the second communication network is not interrupted, in the case where the drone heartbeat packet has not been received for a first predetermined number of times consecutively; modifies the line interruption flag bit of the first communication network to be in use, the line congestion flag bit of the second communication network to be not in use, and performs drone scheduling using the drone flight state data received by the second communication module, if the line congestion flag bit of the first communication network identifies that the first communication network is not in use in the case where receiving the drone heartbeat packet has been recovered for a second predetermined number of times consecutively.

According to a still further aspect of embodiments of the present disclosure, a communication device of a drone is provided. The communication device comprises: a memory; and a processor coupled to the memory, wherein the processor is configured to perform the foregoing communication method of a drone based on the instructions stored in the memory.

According to a still further aspect of embodiments of the present disclosure, a non-transitory readable storage medium is provided. The non-transitory readable storage medium stores computer instructions that, when executed by a processor, implement the foregoing communication method of a drone.

Other features and advantages of the present disclosure will become apparent from the following detailed description of exemplary embodiments of the present disclosure with reference to the accompanying drawings.

BRIEF DESCRIPTION OF THE DRAWINGS

The drawings described herein are used to provide a further understanding of the present disclosure and constitute a part of the present application. The illustrative embodiments of the present disclosure as well as the descriptions are used for explaining the present disclosure, and do not constitute improper definitions on the present disclosure. In the accompanying drawings.

DETAILED DESCRIPTION

Figure 1:
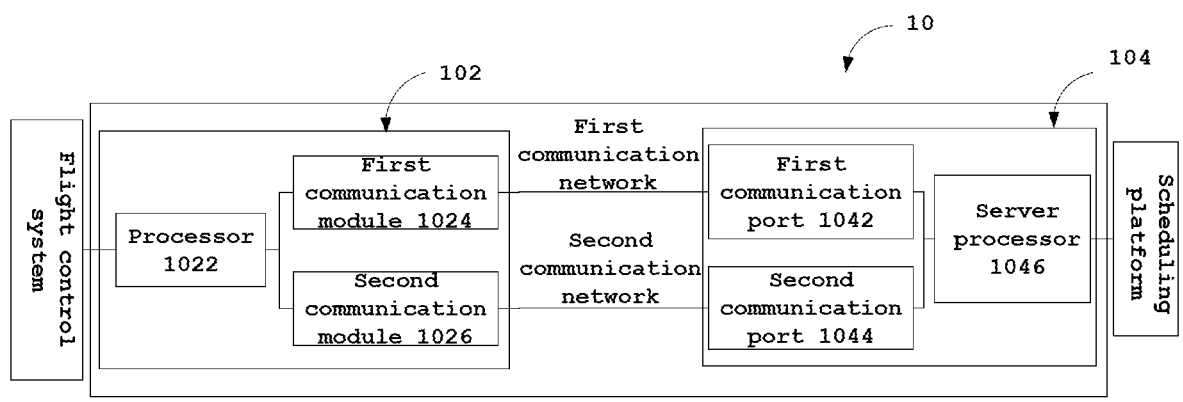
FIG. 1 shows a schematic structural view of some embodiments of the communication system of the present disclosure.

After study, the inventors discover that the digital radio station has an operation frequency of 433 MHz or 915 MHz, and such communication mode is to deploy sending modules and receiving modules on an airborne end of a drone and a ground end respectively, with a communication distance of about 1-10 km, so that it is suitable for aircrafts such as consumer-grade aircraft, aerial photography aircraft, and plant protection aircraft that do not require a long communication distance. The Wi-Fi network forms signal coverage for a certain range in the vicinity by deploying Wi-Fi at a certain site. At present, the industrial-grade Wi-Fi may have a communication distance reaching 30 kilometers under oriented conditions, but is present with problems such as tendency to be masked, unstable signal and limited communication distance. The Bluetooth has a relatively shorter communication distance, so that it is even more difficult to meet the requirements for a communication distance of a logistics drone.

Since the logistics drone needs to complete a whole process of automatic distribution of cargos from a township distribution site to rural promoters, the logistics drone has very high requirements for safety, which raises high requirements for the communication reliability of the logistics drone. If the logistics drone has multiple communication failures such as signal interruption during an air flight, which are embodied in the form that the ground station and the drone lose contact instantaneously, and the original trajectory of the drone disappears on the display screen of the ground station, such failures are present with a major safety hazard of a logistics drone crash due to loss of control. Therefore, how to improve the communication reliability of the logistics drone is an urgent problem to be solved.

One technical problem solved by the present disclosure is how to improve the communication reliability of the drone.

In the present disclosure, the inventors have designed a solution of a dual communication link, in which a dual link mechanism is established by adding a backup module, and data is transmitted using a backup link in the case where the signal of the current communication link is interrupted, such that the data transmitted between the logistics drone and the ground station is maintained to be continuous and stable, thereby reducing the probability that the network of the logistics done is down in a fixed area under the condition of controlling a cost, and enhancing the communication reliability of the logistics drone.

Next, the technical solution in the embodiments of the present disclosure will be explicitly and completely described in combination with the drawings in the embodiments of the present disclosure. Apparently, the described embodiments are merely part of the embodiments of the present disclosure, rather than all the embodiments. The following descriptions of at least one exemplary embodiment which are in fact merely descriptive, by no means serve as any delimitation on the present disclosure as well as its application or use. On the basis of the embodiments of the present disclosure, all the other embodiments acquired by a person skilled in the art on the premise that no inventive effort is involved fall into the scope protected by the present disclosure.

Unless additionally specified, the relative arrangements, numerical expressions and numerical values of the components and steps expounded in these examples do not limit the scope of the present invention. At the same time, it should be understood that, in order to facilitate the description, the dimensions of various parts shown in the drawings are not drown according to actual proportional relations. The techniques, methods, and apparatuses known to a common technical person in the relevant art may not be discussed in detail, but where appropriate, techniques, methods, and apparatuses should be considered as part of the granted description. Among all the examples shown and discussed here, any specific value should be construed as being merely illustrative, rather than as a delimitation. Thus, other examples of exemplary embodiments may have different values. It should be noted that similar reference signs and letters present similar items in the following drawings, and therefore, once an item is defined in a drawing, there is no need for further discussion in the subsequent drawings.

The inventors have analyzed the operation scene of the logistics drone. The logistics drone generally operates in a rural scene, in which the rural base stations are sparsely distributed with an uneven coverage area and the rationality of antenna layout is low and there may even be signal blind area, which therefore results in a low signal receiving efficiency of the logistics drones. If the logistics drone enters a signal blind area or an area where the signal is weak, the probability that the network is down may increase significantly, thus losing contact with the ground. If it is attempted to change the signal distribution in an area covered by a cruise line, and increase the strength and the range of the signal of a cruise area by cooperating with the operator and installing an antenna device covering high altitude at the base station, it is possible to reduce the probability that the network of the logistics drone is down, but the cost is high.

For the drone, a flight control system is a core control device with a function of completing real-time control of the drone. When the logistics drone communicates with the ground station by means of 3G or 4G wireless network, if a communication transmission mode of a single communication link is used to perform real-time data exchange between the flight control system and the ground station, once the communication link is subjected to signal interruption, it will result in that the drone loses contact with the ground station, thereby making it impossible for the display on the ground station to timely track a trajectory of the drone, and increasing a risk.

Based on the above analysis, the inventors have designed a solution of a dual communication link, by making full use of a base station of a cruise area whilst using the antennas of different operators and adding a backup module to establish a dual link mechanism. Data is transmitted using a backup link in the case where the signal of the current communication link is interrupted, such that the data transmitted between the logistics drone and the ground station is maintained to be continuous and stable, thereby reducing the probability that the network of the logistics done is down in a fixed area under the condition of controlling a cost, and enhancing the communication reliability of the logistics drone.

Some embodiments of the communication system provided by the present disclosure are described below in conjunction with FIG. 1.

FIG. 1 shows a schematic structural view of some embodiments of the communication system of the present disclosure. As shown in FIG. 1, the communication system 10 of this embodiment comprises a drone communication system 102 and a communication system 104 of the drone server.

The drone communication system 102 comprises a drone processor 1022, a first communication module 1024, and a second communication module 1026. The drone processor 1022 is electrically connected with the first communication module 1024, the second communication module 1026 and the flight control system through serial interfaces respectively. The drone processor 1022 may use an ARM chip. The communication system 104 of the drone server comprises a first communication port 1042, a second communication port 1044, and a server processor 1046. The server processor 1046 is connected with the first communication port 1042, the second communication port 1044, and the drone scheduling platform respectively.

The communication system 10 has the function of implementing data communication between the flight control system and the drone scheduling platform. The operation process of the communication system 10 will be introduced below in two aspects.

Figure 2:
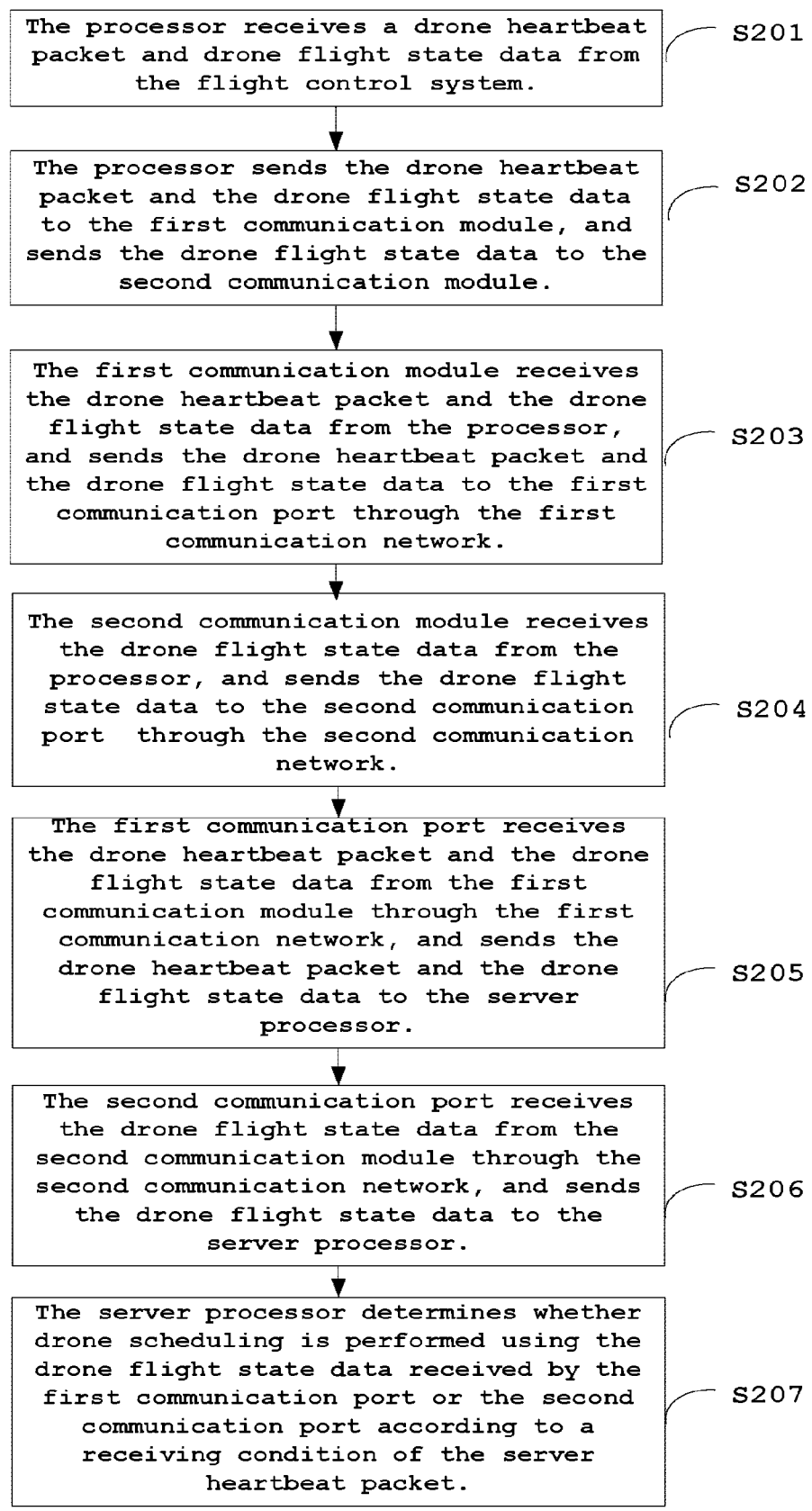
FIG. 2 shows an operation process in which a drone sends data to a drone scheduling platform through a communication system.

FIG. 2 shows an operation process in which a drone sends data to a drone scheduling platform through a communication system 10, wherein the process comprises steps S201~S207.

In step S201, the processor 1022 receives a drone heartbeat packet and drone flight state data from the flight control system.

A receiving condition of the drone heartbeat packet is used by the server to determine whether drone scheduling is performed using the drone flight state data received by the first communication port or the second communication port.

In step S202, the processor 1022 sends the drone heartbeat packet and the drone flight state data to the first communication module 1024, and sends the drone flight state data to the second communication module 1026.

For example, the heartbeat packet is sent in the heartbeat data frame, the drone flight state data is sent in the flight state data frame, the heartbeat data frame and the flight state data frame are spaced apart from each other, and the frequency of the heartbeat data frame is less than that of the flight state data frame.

In step S203, the first communication module 1024 receives the drone heartbeat packet and the drone flight state data from the processor 1022, and sends the drone heartbeat packet and the drone flight state data to the first communication port 1042 through the first communication network.

For example, the first communication module 1024 may package the drone heartbeat packet and the drone flight state data into a TCP packet, and send the packet to the first communication port 1042 through the first communication network.

In step S204, the second communication module 1025 receives the drone flight state data from the processor 1022, and sends the drone flight state data to the second communication port 1044 through the second communication network.

Those skilled in the art should understand that the communication module may use an all-network communication mode, and designate an operator network having a favorable signal coverage of an area as a backup flexibly according to the base station distribution of the operators in a certain area.

In step S205, the first communication port 1042 receives the drone heartbeat packet and the drone flight state data from the first communication module 1024 through the first communication network, and sends the drone heartbeat packet and the drone flight state data to the server processor 1046.

In step S206, the second communication port 1044 receives the drone flight state data from the second communication module 1026 through the second communication network, and sends the drone flight state data to the server processor 1046.

In step S207, the server processor 1046 determines whether drone scheduling is performed using the drone flight state data received by the first communication port 1042 or the second communication port 1046 according to a receiving condition of the drone heartbeat packet.

The flight state data of the drone comprises related operating parameters such as position data and attitude data of the drone. The detailed process of the server processor 1046 to determine whether drone scheduling is performed using the drone flight state data received by the first communication port or the second communication port is described below in conjunction with FIG. 3.

The first communication network and the second communication network respectively have a line congestion flag bit and a line interruption flag bit, wherein the line congestion flag bit is used to identify an operation state of a communication network, and the line interruption flag bit is used to identify an interruption state of a communication network.

The line congestion flag bit of the first communication network is modified to be not in use, and the line interruption flag bit of the first communication network is modified to be interrupted, and the line congestion flag bit of the second communication network is modified to be in use, and data processing is performed using the drone instruction data received by the second communication module, if the line congestion flag bit of the second communication network identifies that the second communication network is not in use, and if the line interruption flag bit of the second communication network identifies that the second communication network is not interrupted, in the case where the server heartbeat packet has not been received for a first predetermined number of times consecutively. The line interruption flag bit of the first communication network is modified to be in use, and the line congestion flag bit of the second communication network is modified to be not in use, and data processing is performed using the drone instruction data received by the first communication module, if the line congestion flag bit of the first communication network identifies that the first communication network is not in use in the case where the server heartbeat packet has been recovered for a second predetermined number of times consecutively.

The line congestion flag bit of the first communication network is modified to be not in use, and the line interruption flag bit of the first communication network is modified to be interrupted, and the line congestion flag bit of the second communication network is modified to be in use, and drone scheduling is performed using the drone flight state data received by the first communication module, if the line congestion flag bit of the second communication network identifies that the second communication network is not in use, and if the line interruption flag bit of the second communication network identifies that the second communication network is not interrupted, in the case where the drone heartbeat packet has not been received for a first predetermined number of times consecutively. The line interruption flag bit of the first communication network is modified to be in use, and the line congestion flag bit of the second communication network is modified to be not in use, and drone scheduling is performed using the drone flight state data received by the second communication module, if the line congestion flag bit of the first communication network identifies that the first communication network is not in use in the case where receiving the drone heartbeat packet has been recovered for a second predetermined number of times consecutively.

Figure 3:
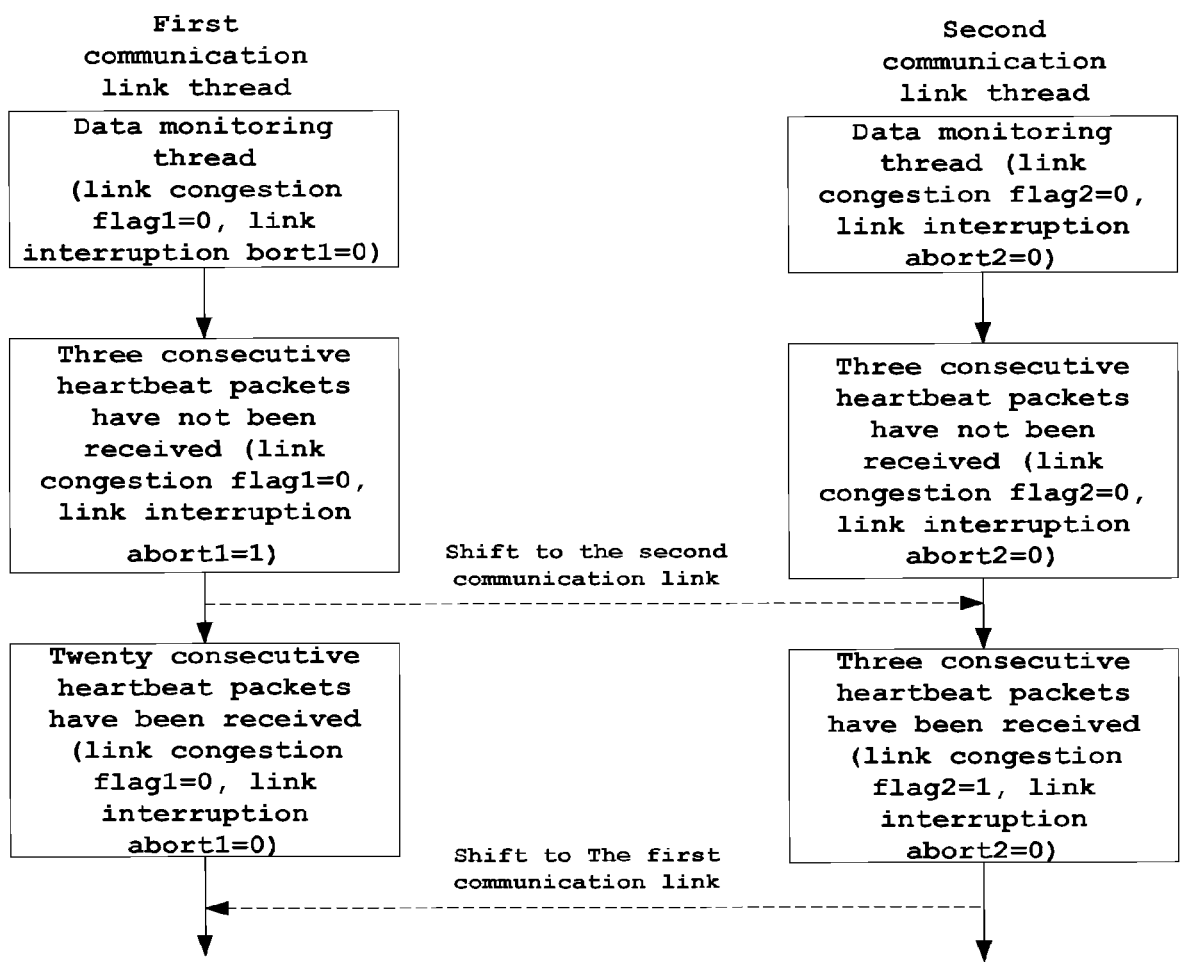
FIG. 3 shows a schematic flowchart of a line decision process of a server processor.

FIG. 3 shows a schematic flowchart of a line decision process of a server processor 1046. As shown in FIG. 3, the thread of each communication link has two flag bits: a line congestion flag bit and a line interruption flag bit. The line congestion flag bit indicates the operational state of the communication link: flag=0 indicates that the communication link is smooth and in use; flag=1 indicates that the line is congested and not in use. The line interruption flag bit indicates the actual interruption state of the communication link: abort=0 indicates that the communication link state is not interrupted, and abort=1 indicates the communication link is in an interrupted state. Under normal circumstances, when the states of the first communication link consist in flag1=0, and abort1=0, it is indicated that the first communication link is in use without congestion, and at the same time the signal of the first communication link is normal without interruption. When the second communication link state consists in flag2=1, and abort2=0, it is indicated that the second communication link is in a congested state and not in use, and the communication signal is normal without interruption. After the first communication link has not received the heartbeat packet of the flight control system for three consecutive times, it is considered that the first communication link is congested, and at the same time an interruption flag is sent to the second communication link to enable the second communication link. At this time, the state bit of the second communication link consists in flag2=0, and abort2=0. After the first communication link has received the heartbeat for 20 consecutive times, and it is considered that the first communication link returns to normal, the first communication link sends a flag bit of abort1=0 to inform the second communication link that the first communication link is smooth, and the communication data of the first communication link is used. At this time, the second communication link is congested but not interrupted, and its state consists in flag2=1, and abort2=0.

After a single communication link used in the conventional art is subjected to dropping, it is necessary to perform operations such as to disenable an original communication connection, release the corresponding data storage space, and re-capture the signal. Therefore, it takes a long time to apply for reconnection. If the design of dual-link and single-communication is used, that is, when one communication link fails, the other communication link starts to communicate, with a time interval of about 30s (if required in practical application). Since the scheduling platform needs to schedule a large number of drones at the same time, if each drone is subjected to a condition of losing contact for about 30 seconds intermittently, it will have a significant negative impact on the scheduling work of the scheduling platform. Therefore, the above-described embodiment uses an operation manner of dual-link and dual-communication, that is, the same data is in two copies that are transmitted simultaneously, and when a communication link fails, the communication link is shifted immediately, and the shifting time may be controlled in 3 to 5 seconds, which ensures continuous and stable data transmission of the drone during the flight, thereby maintaining the synchronous communication between the ground station and the drone as well as the function of instant flight control.

Figure 4:
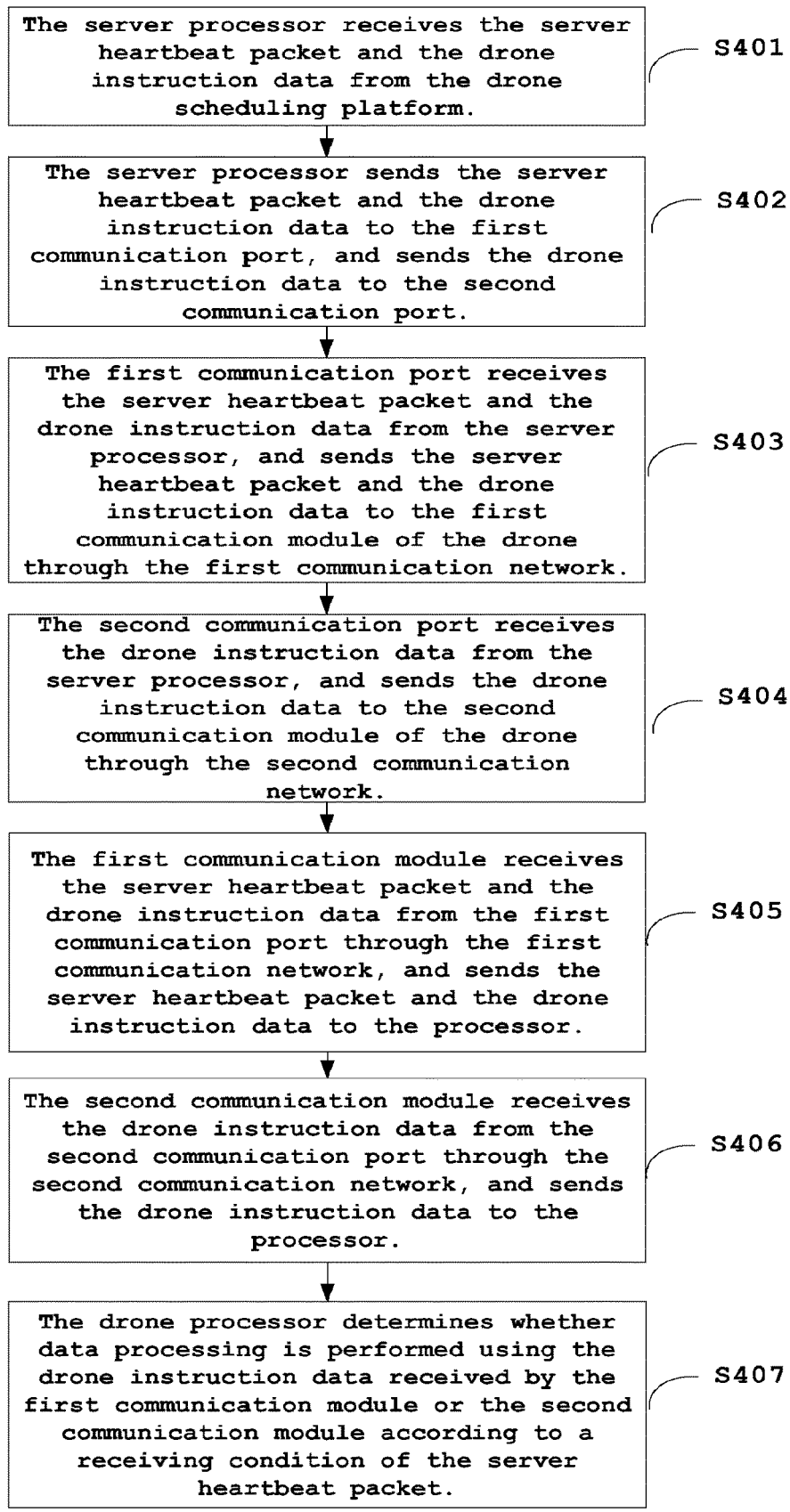
FIG. 4 shows an operation process in which a drone scheduling platform sends data to a drone through a communication system.

FIG. 4 shows an operation process in which: a drone scheduling platform sends data to a drone through a communication system 10, wherein the process comprises steps S401-S407.

In step S401, the server processor 1046 receives the server heartbeat packet and the drone instruction data from the drone scheduling platform.

A receiving condition of the server heartbeat packet is used by the drone processor to determine whether data processing is performed using the drone instruction data received by the first communication module or the second communication module.

In step S402, the server processor 1046 sends the server heartbeat packet and the drone instruction data to the first communication port 1042, and sends the drone instruction data to the second communication port 1044.

For example, the heartbeat packet is sent in the heartbeat data frame, and the drone instruction data is sent in the drone instruction data frame, and the heartbeat data frame and the drone instruction data frame are spaced apart from each other, and the frequency of the heartbeat data frame is less than that of the drone instruction data.

In step S403, the first communication port 1042 receives the server heartbeat packet and the drone instruction data from the server processor 1046, and sends the server heartbeat packet and the drone instruction data to the first communication module 1024 of the drone through the first communication network.

In step S404, the second communication port 1044 receives the drone instruction data from the server processor 1046, and sends the drone instruction data to the second communication module 1026 of the drone through the second communication network.

In step S405, the first communication module 1024 receives the server heartbeat packet and the drone instruction data from the first communication port 1042 through the first communication network, and sends the server heartbeat packet and the drone instruction data to the processor 1022.

In step S406, the second communication module 1026 receives the drone instruction data from the second communication port 1044 through the second communication network, and sends the drone instruction data to the processor 1022.

In step S407, the drone processor 1022 determines whether data processing is performed using the drone instruction data received by the first communication module 1024 or the second communication module 1026 according to a receiving condition of the server heartbeat packet.

The drone instruction data may specifically comprise drone track data and a drone request instruction. The process of the drone determining whether data processing is performed using the drone instruction data received by the first communication module 1024 or the second communication module 1026 according to a receiving condition of the server heartbeat packet, is similar to the process shown in FIG. 2, and the specific steps will not be described in detail.

For example, suppose there are base stations of three operators A, B, and C in a certain area, and the probability that the network of the base station of China Unicorn is down when used alone is P (A), and the probability that the network of the base station of China Mobile is down when used alone is P (B), and the probability that the network of the base station of China Telecom is down when used alone is P (C), and A, B, and C are mutually independent events. When the A and B base stations are used simultaneously, the probability that the network is down is P(AB)=P(A)·P(B). If it is set that P(A)=0.1 and P(B)=0.1, then P(AB)=0.1× 0.1=0.01, so that the probability that the network is down may be reduced by an order of magnitude.

In addition, the above-described embodiment may control the cost to a certain extent whilst increasing the communication reliability of the logistics drone. Relative to a single-communication communication link, the hardware cost of the above-described embodiment only needs to add one communication module and one SIM card chip. In the communication process, the cost of the operation traffic for data transmission is low.

Figure 5:
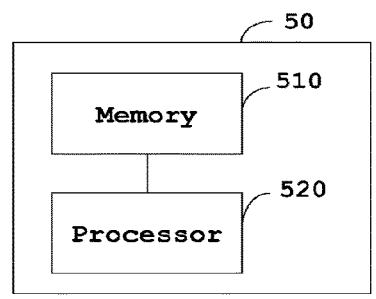
FIG. 5 shows a structural view of some embodiments of the communication device of a drone according to the present disclosure.

FIG. 5 shows a structural view of some embodiments of the communication device of a drone according to the present disclosure. As shown in FIG. 5, the communication device 50 of the drone of these embodiments comprise: a memory 510 and a processor 520 coupled to the memory 510, wherein the processor 520 is configured to perform the communication method of the drone in any of the foregoing embodiments, or the communication method of the drone server in any of the foregoing embodiments based on the instructions stored in the memory 510.

The memory 510 may comprise, for example, a system memory, a fixed non-volatile storage medium, or the like. The system memory stores, for example, an operation system, an application, a boot loader, and other programs.

Figure 6:
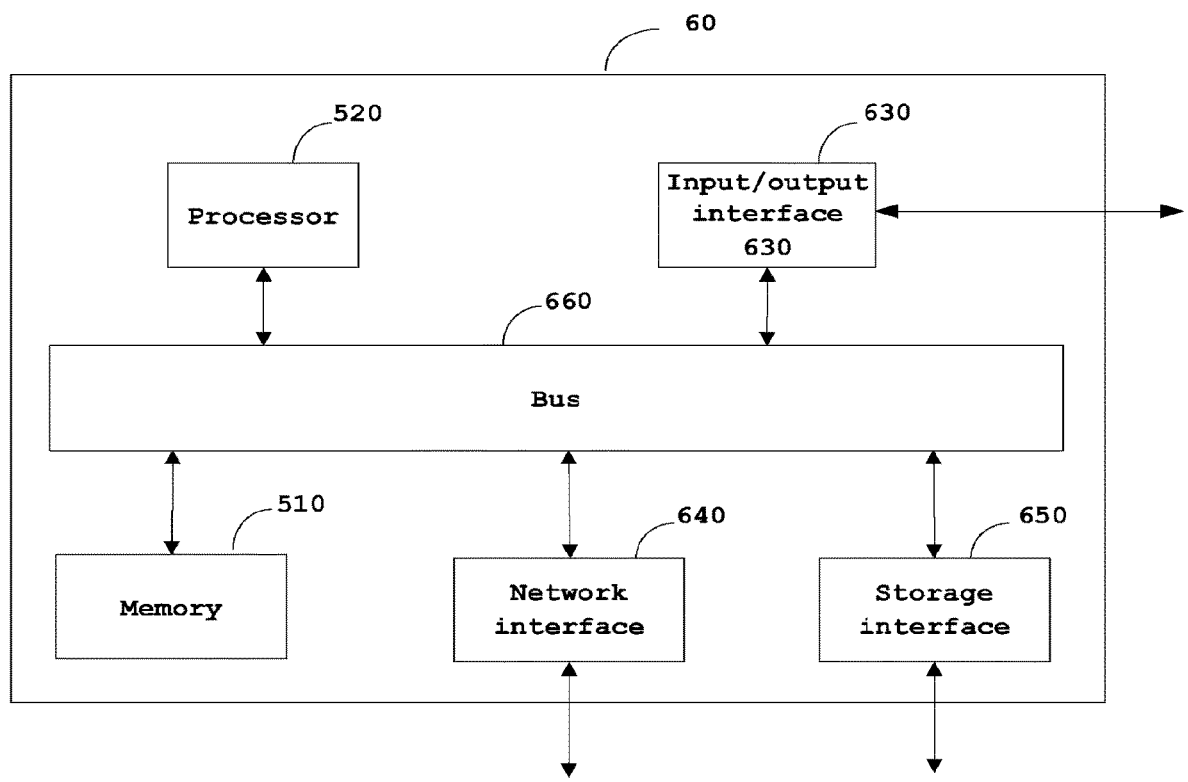
FIG. 6 shows a structural view of other embodiments of the communication device of a drone according to the present disclosure.

FIG. 6 shows a structural view of other embodiments of the communication device of a drone according to the present disclosure. As shown in FIG. 6, the communication device 60 of the drone of this embodiment comprises: a memory 510 and a processor 520, and may further comprise an input/output interface 630, a network interface 640, a storage interface 650, and the like. These interfaces 630, 640, 650 as well as the memory 510 and the processor 520 therebetween may be connected, for example, via a bus 660. The input/output interface 630 provides a connection interface for input/output devices such as a display, a mouse, a keyboard, and a touch screen. The network interface 640 provides a connection interface for various networked devices. The storage interface 650 provides a connection interface for an external storage device such as an SD card or a USB flash drive.

The present disclosure also comprises a computer readable storage medium having stored computer instructions thereon for the processor to perform the communication method of a drone in any of the foregoing embodiments, or the communication method of a drone server in any of the foregoing embodiments.

Those skilled in the art will appreciate that the embodiments of the present disclosure may be provided as a method, system, or computer program product. Therefore, the present disclosure may take the form of an entire hardware embodiment, an entire software embodiment, or a combination of software and hardware aspects. Moreover, the present disclosure may take the form of a computer program product embodied in one or more computer-usable non-transitory storage media (including but not limited to disk memory, CD-ROM, optical memory, and the like) containing computer usable program codes therein.

The present disclosure is described with reference to the flow charts and/or block diagrams of methods, devices (systems), and computer program products according to the embodiments of the present disclosure. It will be understood that each step and/or block of the flow charts and/or block diagrams as well as a combination of steps and/or blocks of the flow charts and/or block diagrams may be implemented by a computer program instruction. These computer program instructions may be provided to a processor of a general purpose computer, special purpose computer, an embedded processing machine, or other programmable data processing devices to produce a machine, such that the instructions executed by a processor of a computer or other programmable data processing devices produce a device for realizing a function designated in one or more steps of a flow chart and/or one or more blocks in a block diagram.

These computer program instructions may also be stored in a computer readable memory that can guide a computer or other programmable data processing device to operate in a particular manner, such that the instructions stored in the computer readable memory produce a manufacture including an instruction device. The instruction device realizes a function designated in one or more steps in a flow chart or one or more blocks in a block diagram.

These computer program instructions may also be loaded onto a computer or other programmable data processing devices, such that a series of operational steps are performed on a computer or other programmable device to produce a computer-implemented processing, such that the instructions executed on a computer or other programmable devices provide steps for realizing a function designated in one or more steps of the flow chart and/or one or more blocks in the block diagram.

The above descriptions are only the preferred embodiments of the present disclosure, but do not serve to limit the present disclosure. Any amendment, equivalent replacement, improvement, and the like made within the spirit and principles of the present disclosure should all be contained within the protection scope of the present disclosure.

What is claimed is:

1. A drone communication system, comprising:
a first communication module;
a second communication module; and
a drone processor electrically connected to the first communication module and the second communication module respectively, and configured to:
receive and send a heartbeat packet and communication data through the first communication module and a first communication network, to communicate with a first communication port of a server;
receive and send communication data through the second communication module and a second communication network, to communicate with a second communication port of the server; and
determine whether data processing is performed using drone instruction data received by the first communication network or the second communication network according to a receiving condition of a server heartbeat packet, wherein
the first communication module is configured to receive the server heartbeat packet and the drone instruction data from the first communication port of the server through the first communication network, and send the server heartbeat packet and the drone instruction data to the drone processor;
the second communication module is configured to receive the drone instruction data from the second communication port of the server through the second communication network, and send the drone instruction data to the drone processor;
the first communication network and the second communication network respectively have a line congestion flag bit and a line interruption flag bit, wherein the line congestion flag bit is used to identify an operation state of a communication network, and the line interruption flag bit is used to identify an interruption state of a communication network; and the drone processor is configured to:

modify the line congestion flag bit of the first communication network to be not in use, the line interruption flag bit of the first communication network to be interrupted, the line congestion flag bit of the second communication network to be in use, and perform data processing using the drone instruction data received by the second communication module, if the line congestion flag bit of the second communication network identifies that the second communication network is not in use, and if the line interruption flag bit of the second communication network identifies that the second communication network is not interrupted, in the case where the server heartbeat packet has not been received for a first predetermined number of times consecutively; and modify the line interruption flag bit of the first communication network to be in use, the line congestion flag bit of the second communication network to be not in use, and perform data processing using the drone instruction data received by the first communication module, if the line congestion flag bit of the first communication network identifies that the first communication network is not in use in the case where receiving the server heartbeat packet has been recovered for a second predetermined number of times consecutively.

2. A communication system, comprising the drone communication system according to claim 1, and a communication system of a drone server, comprising:

the first communication port;

the second communication port; and a server processor electrically connected to the first communication port and the second communication port respectively; and configured to:

receive and send the heartbeat packet and the communication data through the first communication port and the first communication network, to communicate with the first communication module of the drone communication system; and receive and send the communication data through the second communication port and the second communication network, to communicate with the second communication module of the drone communication system, wherein a receiving condition of the heartbeat packet is used to determine whether to use the communication data received by the first communication network or the second communication network.

3. A communication system of a drone server, comprising:

a first communication port;

a second communication port; and a server processor electrically connected to the first communication port and the second communication port respectively and electrically connected to a drone scheduling platform; and configured to:

receive and send a heartbeat packet and communication data through the first communication port and a first communication network, to communicate with a first communication module of a drone communication system;

receive and send communication data through the second communication port and a second communication network, to communicate with a second communication module of the drone communication system;

determine whether drone scheduling is performed using drone flight state data received by the first communication network or the second communication network according to a receiving condition of a drone heartbeat packet, wherein the first communication port is configured to: receive the drone heartbeat packet and the drone flight state data from the first communication module of the drone through the first communication network; and send the drone heartbeat packet and the drone flight state data to the server processor;

the second communication port is configured to: receive the drone flight state data from the second communication module of the drone through the second communication network; and send the drone flight state data to the server processor;

the first communication network and the second communication network respectively have a line congestion flag bit and a line interruption flag bit, wherein the line congestion flag bit is used to identify an operation state of a communication network, and the line interruption flag bit is used to identify an interruption state of a communication network; and the server processor is configured to:

modify the line congestion flag bit of the first communication network to be not in use, the line interruption flag bit of the first communication network to be interrupted, the line congestion flag bit of the second communication network to be in use, and perform the drone scheduling using the drone flight state data received by the first communication module, if the line congestion flag bit of the second communication network identifies that the second communication network is not in use, and if the line interruption flag bit of the second communication network identifies that the second communication network is not interrupted, in the case where the drone heartbeat packet has not been received for a first predetermined number of times consecutively; and modify the line interruption flag bit of the first communication network to be in use, the line congestion flag bit of the second communication network to be not in use, and perform the drone scheduling using the drone flight state data received by the second communication module, if the line congestion flag bit of the first communication network identifies that the first communication network is not in use in the case where receiving the drone heartbeat packet has been recovered for a second predetermined number of times consecutively.

4. A communication method of a drone, comprising:

receiving and sending a heartbeat packet and communication data through a first communication module and a first communication network by a drone processor, to communicate with a first communication port of a server; and receiving and sending communication data through a second communication module and a second communication network by the drone processor, to communicate with a second communication port of the server, wherein a receiving condition of the heartbeat packet is used to determine whether to use the communication data received by the first communication network or the second communication network, the first communication module receives a server heartbeat packet and drone instruction data from the first communication port of the server through the first communication network, and sends the server heartbeat packet and the drone instruction data to the drone processor;

the second communication module receives the drone instruction data from the second communication port of the server through the second communication network, and sends the drone instruction data to the drone processor;

the drone processor determines whether data processing is performed using the drone instruction data received by the first communication module or the second communication module according to a receiving condition of the server heartbeat packet;

the first communication network and the second communication network respectively have a line congestion flag bit and a line interruption flag bit, wherein the line congestion flag bit is used to identify an operation state of a communication network, and the line interruption flag bit is used to identify an interruption state of a communication network;

the drone processor modifies the line congestion flag bit of the first communication network to be not in use, the line interruption flag bit of the first communication network to be interrupted, the line congestion flag bit of the second communication network to be in use, and performs data processing using the drone instruction data received by the second communication module, if the line congestion flag bit of the second communication network identifies that the second communication network is not in use, and the line interruption flag bit of the second communication network identifies that the second communication network is not interrupted in the case where the server heartbeat packet has not been received for a first predetermined number of times consecutively; and the drone processor modifies the line interruption flag bit of the first communication network to be in use, the line congestion flag bit of the second communication network to be not in use, and performs data processing using the drone instruction data received by the first communication module, if the line congestion flag bit of the first communication network identifies that the first communication network is not in use in the case where the server heartbeat packet has been recovered for a second predetermined number of times consecutively.

5. The communication method according to claim 4, wherein the communication method further comprises:

receiving and sending the heartbeat packet and the communication data through the first communication port and the first communication network by a server processor, to communicate with the first communication module of a drone communication system;

receiving and sending the communication data through the second communication port and the second communication network by the server processor, to communicate with the second communication module of the drone communication system.

6. The communication method according to claim 5, wherein the first communication port receives a drone heartbeat packet and drone flight state data from the first communication module of the drone through the first communication network, and sends the drone heartbeat packet and the drone flight state data to the server processor;

the second communication port receives the drone flight state data from the second communication module of the drone through the second communication network, and sends the drone flight state data to the server processor; and the server processor determines whether drone scheduling is performed using the drone flight state data received by the first communication port or the second communication port according to the receiving condition of the drone heartbeat packet.

7. The communication method according to claim 6, wherein the server processor modifies the line congestion flag bit of the first communication network to be not in use, the line interruption flag bit of the first communication network to be interrupted, the line congestion flag bit of the second communication network to be in use, and performs the drone scheduling using the drone flight state data received by the first communication module, if the line congestion flag bit of the second communication network identifies that the second communication network is not in use, and if the line interruption flag bit of the second communication network identifies that the second communication network is not interrupted, in the case where the drone heartbeat packet has not been received for the first predetermined number of times consecutively; and the server processor modifies the line interruption flag bit of the first communication network to be in use, the line congestion flag bit of the second communication network to be not in use, and performs the drone scheduling using the drone flight state data received by the second communication module, if the line congestion flag bit of the first communication network identifies that the first communication network is not in use in the case where receiving the drone heartbeat packet has been recovered for the second predetermined number of times consecutively.

8. The communication method according to claim 5, wherein the server processor receives the server heartbeat packet and the drone instruction data from a drone scheduling platform and sends the server heartbeat packet and the drone instruction data to the first communication port, and sends the drone instruction data to the second communication port;

the first communication module receives the server heartbeat packet and the drone instruction data from the server processor, and sends the server heartbeat packet and the drone instruction data to the first communication module of the drone through the first communication network;

the second communication module receives the drone instruction data from the server processor, and sends the drone instruction data to the second communication module of the drone through the second communication network; and the receiving condition of the server heartbeat packet is used by the drone to determine whether data processing is performed using the drone instruction data received by the first communication module or the second communication module.

9. A communication device of a drone, comprising:
a memory; and
a processor coupled to the memory, wherein the processor is configured to perform the communication method of the drone according to claim 4 based on instructions stored in the memory.

10. A non-transitory readable storage medium, wherein the non-transitory readable storage medium stores computer instructions that, when executed by a processor, implement the communication method of the drone according to claim claim 4.

* * * * *